United States Patent
Takatani

[19]

[11] Patent Number: 6,151,674
[45] Date of Patent: Nov. 21, 2000

[54] NETWORK COMPUTER, AND BOOT METHOD APPLIED TO NETWORK COMPUTER

[75] Inventor: Masahiro Takatani, Tokyo, Japan

[73] Assignee: Kabushiki Kaisha Toshiba, Kawasaki, Japan

[21] Appl. No.: 09/156,897

[22] Filed: Sep. 18, 1998

[30] Foreign Application Priority Data

Feb. 27, 1998 [JP] Japan .................................. 10-047910

[51] Int. Cl.[7] ................................................. G06F 15/177
[52] U.S. Cl. .............................................. 713/2; 709/222
[58] Field of Search ................................. 709/22; 713/2; 395/700, 712; 717/11

[56] References Cited

U.S. PATENT DOCUMENTS

| | | | |
|---|---|---|---|
| 5,142,680 | 8/1992 | Ottman | 395/700 |
| 5,452,454 | 9/1995 | Basu | 395/700 |
| 5,577,210 | 11/1996 | Abdous | 395/200.1 |
| 5,742,829 | 4/1998 | Davis | 395/712 |
| 5,758,165 | 5/1998 | Shuff | 395/712 |
| 5,842,011 | 11/1998 | Basu | 395/652 |

*Primary Examiner*—William Grant
*Assistant Examiner*—Ronald D Hartman, Jr.
*Attorney, Agent, or Firm*—Finnegan, Henderson, Farabow, Garett, & Dunner, L.L.P.

[57] ABSTRACT

A network computer, operating upon downloading programs and data necessary for data processing from a server computer, comprises a local storage device for storing programs and data downloaded from the server, and means for obtaining from the server an OS and information of setting up an environment for setting up working environment at the start of the network computer, and storing in the local storage device. By storing the OS and information of setting up the environment in the local storage device as described above, the network computer can be started from the local storage device at high speed without accessing the server, and a network computer suitable for mobile uses can be realized.

6 Claims, 5 Drawing Sheets

NETWORK COMPUTER, AND BOOT METHOD APPLIED TO NETWORK COMPUTER

BACKGROUND OF THE INVENTION

The present invention relates to a network computer operating upon downloading programs and data necessary for data processing from a server (server computer), and a boot method applied to this computer.

This application is based on Japanese Patent Application No. 10-047910 filed on Feb. 27, 1998, the content of which is incorporated herein by reference.

In recent years, new computer architectures called network computers have been developed in place of personal computers.

This network computer is designed to be used while being connected to a network, and downloads all programs and data necessary for data processing from the server via the network. Each network computer operating as a client of the server need not have the programs or data and can flexibly cope with updating or the like of the OS (Operating System) and application programs. The total cost of ownership can, therefore, be drastically reduced.

The network computer is designed to be used while being connected to the network, as described above. No consideration is generally made for use in a mobile environment in which the computer is not connected to the network. A new network computer which can perform the same operations as in the online state in which the computer is connected to the network must be developed even in an offline state in which the computer is not connected to the network.

BRIEF SUMMARY OF THE INVENTION

It is the first object of the present invention to provide a network computer suitable for a mobile uses which can start the OS (Operating System) from a local storage device without connecting to a server.

It is the second object of the present invention to provide a boot method applied to a network computer.

The first object is achieved by the following network computer. That is, a network computer according to the present invention, operating upon downloading programs and data necessary for data processing from a server (server computer), comprises a local storage device for storing a part of the programs and data downloaded from the server, and means for obtaining from the server an operating system and information of setting up an environment for setting up working environment at the start of the network computer and storing in the local storage device.

The second object is achieved by the following boot method applied to a network computer. That is, a boot method, according to the present invention applied to a network computer having a local storage device and operating by using programs and data necessary for data processing downloaded from a server, comprises the steps of obtaining an OS stored in the server, and storing in the local storage device the obtained OS and information of setting up an environment obtained from the server for setting up working environment at the start of the network computer.

When the OS managed on the server is stored in the local storage device of the network computer, information of setting up an environment obtained from the server by the OS for setting up working environment at the start of network computer is also stored in the local storage device of the network computer.

When the OS has already been stored in the local storage device, the network computer preferably starts operating by using the OS and information of setting up the environment stored in the local storage device.

Not only the OS but also information of setting up the environment necessary for controlling the operation of the network computer by the OS are stored in the local storage device. The network computer which sets up the working environment using information of setting up the environment managed by the server can start the system without accessing the server. Therefore, the network computer can start operating in the offline state without connecting to the network and can start the OS at high speed even in the online state.

The network computer may further comprise means for determining whether the OS stored in the local storage device matches the OS stored in the server when the network computer is started using the OS and information of setting up the environment stored in the local storage device, and means for obtaining from the server the OS stored in the server and information of setting up the environment for setting up working environment at the start of the network computer and storing again in the local storage device when the OS stored in the local storage device does not match the OS stored in the server.

The contents stored in the local storage device can be updated to the latest OS and working environment, thus coping with upgrading of the OS.

The version and type of OS to be downloaded to the network computer can be arbitrarily designated by the administrator of the server. The administrator can designate a specific type and version of OS to be used in the network computer. It is determined whether the OS stored in the local storage device matches the OS designated by the server. If no, the OS stored in the local storage device is replaced with the OS designated by the server, and at the same time, information of setting up the environment stored in the local storage device is also replaced with the one designated by the server. Even if the version of the OS to be used is changed (upgraded or downgraded) during the system operation, or the type of OS to be used is changed during the system operation, the network computer according to the present invention can flexibly cope with such changes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawing.

System Arrangement of Network Computer

Figure 1:
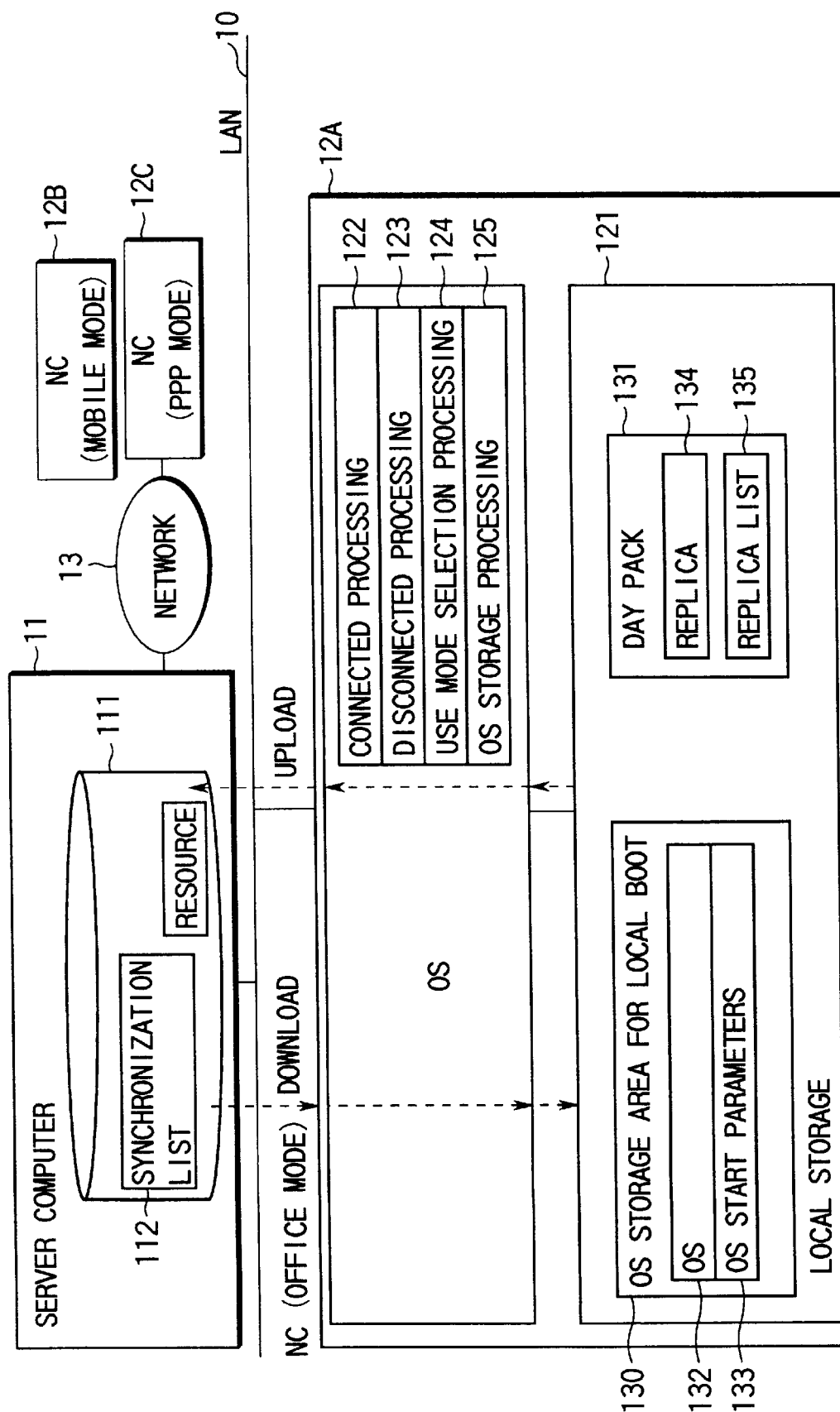
FIG. 1 is a block diagram showing an example of the system arrangement of a network computer according to an embodiment of the present invention.

FIG. 1 shows the system arrangement of a network computer according to an embodiment of the present invention.

A network computer (NC) 12 (reference numeral 12 represents NCs 12A, 12B, and 12C in FIG. 1) operates upon downloading programs and data e.g., OS (Operating System) and application programs necessary for data processing from a server (server computer) 11 via a network 13 such as a LAN 10 or a public switched telephone network. Note that the network computer (NC) 12 is a computer operating as a client in the network computer according to this embodiment.

In the office, the network computer 12A is used connecting to the LAN 10 (office mode).

Outside the office, the network computer 12B is basically used without connecting to the server 11 (mobile mode). However, a computer such as the network computer 12C may be remote-connected to the server using the PPP (Point to Point Protocol) via the network, as needed (PPP mode).

The server 11 provides resources such as programs and data to each network computer 12 operating as a client machine. The resources are stored and managed in a hard disk drive 111 of the server 11.

The network computer 12A has a local storage device 121 to perform operations in the offline state. The local storage 121 stores a replica 134 as a copy of the resources such as programs and data of the server 11. This replica 134 is stored in a specific memory area (to be referred to as a Day Pack 131 hereinafter) in the local storage 121 of the network computer 12. A specific resource which is to be downloaded as the replica 134 to the network computer 12A is managed by a synchronization list 112 on the server 11.

A replica list 135 which is a copy of the synchronization list 112 is also downloaded and stored in the local storage 121 when the resources are downloaded to the network computer 12A to make the replica 134. The network computer 12 can operate without accessing to the server 11 by using the replica 134 stored in the local storage 121. A nonvolatile memory such as a flash memory or a hard disk drive is used as the local storage 121.

The synchronization list 112 describes files serving as targets of data synchronization processing performed to maintain data consistency between the server 11 and the local storage 121 of the network computer 12. File names and the like to be performed synchronization processing are managed by this synchronization list 112 for each network computer. This synchronization processing allows continuous operations on the network computer 12 regardless of in the offline state or in the online state. Downloading and uploading the resources between the network computer 12 and the server 11 allow synchronization between the server resources and the replica 134 in the local storage 121, thereby assuring data consistency. This synchronization processing is executed at the time of the login or logout of the network computer 12.

The local storage 121 also has a OS storage area 130 for local booting. An OS 132 and OS start parameters 133 necessary for booting the system from the local storage 121 are stored in the OS storage area 130 for local booting. The OS 132 which the server 11 manages and stores for the network computer 12 is downloaded and obtained from the server 11. The OS start parameters 133 are also downloaded and obtained from the server 11 by the OS executed in the network computer 12. The OS start parameter 133 is information of setting up the environment necessary for setting up the working environment of the network computer 12 and managed on the server 11. This information of setting up the environment is obtained from the server 11 at the time of setting up the environment of the network computer 12 by the OS. In this embodiment, the information of setting up the environment (OS start parameters 133) is stored together with the OS 132 to realize local booting.

More specifically, the OS start parameters 133 comprise various DHCP parameters leased from the server 11 by the DHCP (Dynamic Host Configuration Protocol). The DHCP parameters comprise (1) network server information, (2) client information, (3) parameters to be delivered to the OS, and (4) pass names of files of the OS to be downloaded to the network computer 12. The above-mentioned network information includes the IP address of the time server (Timeserv), the IP address of the DNS server (DNSserv), the IP address of the NIS server (NISserv), the IP address of the boot server (BootServ), the IP address of the router (Router), the DNA domain name (DNAdmain), and the NIS domain name (NISdmain). The above-mentioned client information includes the broadcast address (Broadcst), the subnet address (Subnet), the maximum transfer unit number (MTU), and the IP address valid time (LeaseTim). The above-mentioned parameters to be delivered to the OS include, for example, the language used by a user, initial start applications, the URL of additional parameters, and existence of debug output, when JavaOS is used as a OS.

A connected processing function 122 and a disconnected processing function 123 are prepared for the OS to be downloaded from the server 11 to the network computer 12. The connected processing function 122 controls the network computer 12 in the network operation mode in which the network computer 12 operates accessing the sever 11. The disconnected processing function 123 enables the network computer 12 to operate in the offline state by using the local storage 121.

In addition, the OS initialization program also has a use mode selection processing function 124 and an OS storage processing function 125. The use mode selection processing function 124 allows selection of one of the two modes, i.e., the network operation mode and the disconnected operation mode at the time of the login of the network computer 12 and sets up the working environment corresponding to the selected mode. The OS storage processing function 125 as the characteristic feature of the present invention is a function of storing the OS 132 and the OS start parameters 133 in the OS storage area 130 for local booting in the local storage 121.

The basic operation mode of the network computer 12 of this embodiment will be described below.

The disconnected operation mode designed for the operation in the offline state supports the mobile mode mentioned above and uses the replica 134 of the resources. The specific storage area in the local storage 121 which stores the replica 134 used in this mobile mode is called a Day Pack 131. The Day Pack 131 is a specific storage area in the local storage 121 which stores the programs and data necessary for use of the network computer 12 in the mobile mode.

The replica 134 of the programs and data of the server 11, which is required in the mobile mode, is downloaded from the server 11 to the Day Pack 131 in advance. The operation performed in the network operation mode (office mode or PPP mode) can be continuously performed even after the mode changes to the disconnected operation mode.

Even in the network operation mode, the Day Pack 131 for making the replica 134 of the server resource may be used to prepare for the shift to the operation in the offline mode. The downloading operation for making this replica 134 is executed as an initialization processing of the synchronization processing.

The number of connection modes of the network computer 12 is five as follows.

Connection Modes of Network Computer
Office Modes
(1) LAN & Day Pack mode
(2) LAN mode (Day Pack is not used)
Mobile Modes
(3) Day Pack mode
(4) PPP & Day Pack mode
(5) PPP mode (Day Pack is not used)

The office modes are classified into modes (1) and (2), and the mobile modes are classified into modes (3) to (5). Normally, only mode (3) or (4) is used, and mode (5) is not used. Therefore, the connection modes (1) to (4) are used in practice.

Figure 2:
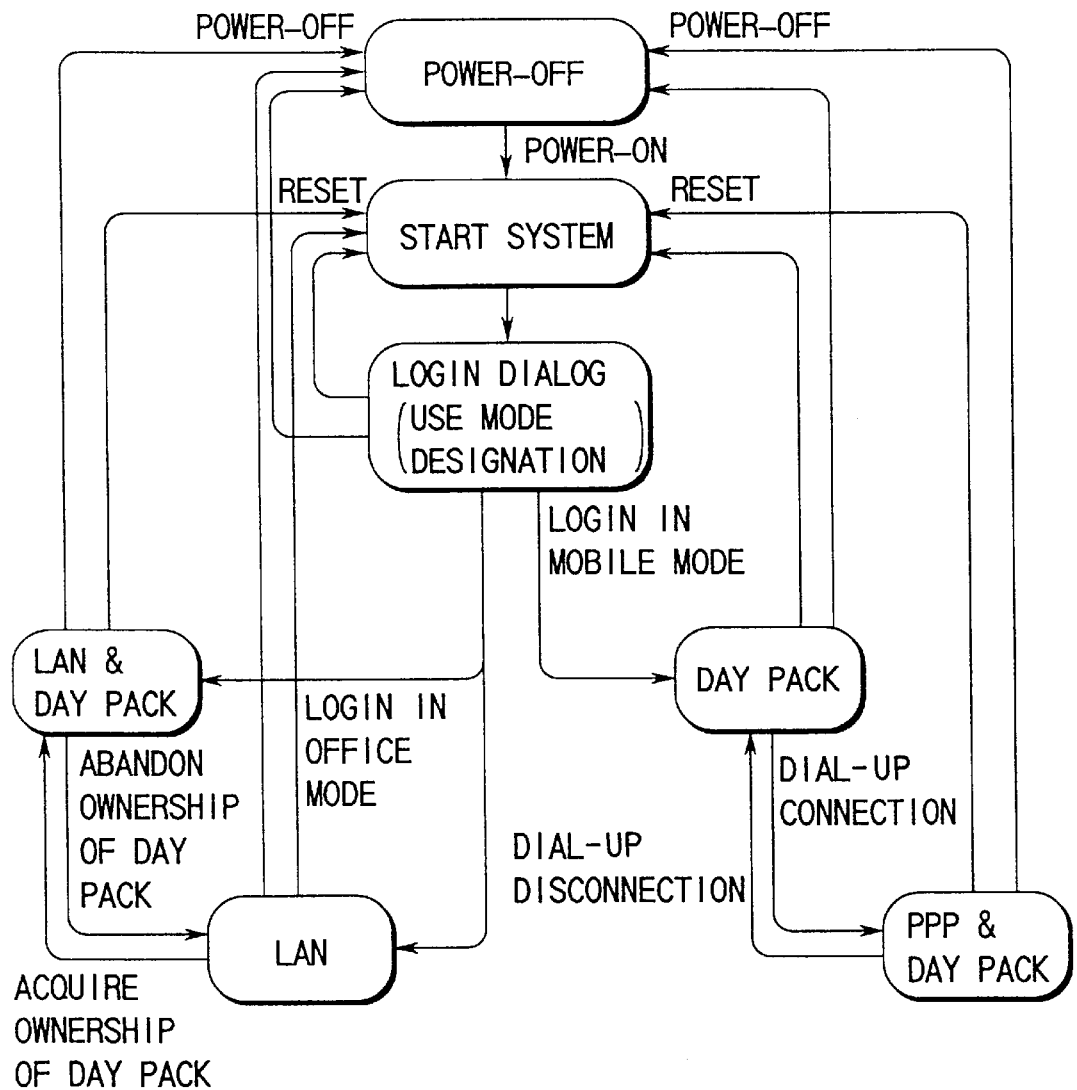
FIG. 2 is a chart showing the transition of connection modes of a network computer according to the embodiment.

The transition of these connection modes is shown in FIG. 2.

When the network computer 12 is powered on in the power-off state or reset in the power-on state, initialization processing (system start) is executed by the OS. In login processing for obtaining, from the server 11, the environment required for the operation of the network computer 12, the login dialog is displayed on the screen of the network computer 12. An operation mode to be used is selected on the login dialog. The operation modes to be used are classified into the "office modes" and "mobile modes".

The "office mode" is a mode designed for use in an office where the LAN can be used. When the "office mode" is selected, the connection mode is set as the LAN mode or LAN & Day Pack mode.

The "mobile mode" is a mode designed for use outside the office, where the LAN can not be used. When the "mobile mode" is selected, the connection mode is set as the Day Pack mode or PPP & Day Pack mode.

The mechanism for selecting and shifting these modes to be used is incorporated in OS initialization processing.

The connection mode will be described in detail below.
(a) Use of Day Pack 131 in LAN Mode
If the Day Pack 131 whose ownership is held by a user exists in the LAN mode, the LAN & Day Pack mode is automatically set. When the Day Pack 131 whose ownership is held by the user exists, the LAN mode is not set.

Abandonment of Ownership of Day Pack 131
The ownership of the Day Pack 131 can always be abandoned in the LAN & Day Pack mode. When the ownership of the Day Pack 131 is abandoned, the mode shifts to the LAN mode.

Setting of Ownership of Day Pack 131
If the Day Pack 131 whose ownership is not held exists in the LAN mode, the ownership can be set for this Day Pack 131. When the ownership is set for the Day Pack 131, the mode shifts to the LAN & Day Pack mode.
(b) Use of PPP in Day Pack Mode
The use of the PPP (Point to Point Protocol) can be started at any time in the Day Pack mode. When the use of the PPP is started, the mode shifts to the PPP & Day Pack mode. To the contrary, the use of the PPP can be terminated at any time in the PPP & Day Pack mode. When the use of the PPP is terminated, the mode shifts to the Day Pack mode. When the network computer 12 uses the PPP, it is connected to the server 11 via a network such as a public network. The examples of the public network are a public switched telephone network and a portable telephone network.
(c) PPP Mode
The PPP mode without using the Day Pack 131 is not used.

This is because a PPP connection is required to shift the mode to the PPP mode and various kinds of information required for dial-up for the PPP connection must be directly input by the user.

The PPP & Day Pack mode must be shifted from the Day Pack mode. For this reason, various kinds of information required for dial-up for the PPP connection can be stored in the Day Pack 131. This information can be set in the server 11 in advance.

Considering mobile uses, no problem arises if the use of the PPP is limited in using the Day Pack 131.
(d) Reset and Power-Off
Resetting and power-off can be performed off in all the modes. Resetting means to initialize the data section of the OS and execute a system initialization routine. The power-off means to turn off hardware power supply.

OS Storage Processing
OS storage processing as a characteristic feature of the present invention will be described with reference to the flow chart in FIG. 3. This OS storage processing is performed by the operating system, as described previously.

Timing of storing OS is the first activation operation of the network computer 12 and its booting operation except for the first activation operation.
(1) First Activation Operation of Network Computer
No OS exists in the local storage 121 in the first activation operation of the network computer 12. The network computer 12 starts operating while being connected to the network. When the network computer 12 is not connected to the network, the OS cannot be downloaded from the server 11 to the network computer 12, and no system can be started.

When the OS starts operating, hardware is detected by internal processing in step S11 to check if the OS 132 for local booting and the OS start parameters 133 exist in the local storage 121.

In the first activation operation of the network computer 12, neither the OS 132 for local booting nor the OS start parameters 133 exists in the local storage 121. In step S12, the network computer 12 downloads the OS which the server 11 manages and stores for the network computer 12 stores in the local storage 121. In step S13, the network computer 12 also stores the OS start parameters 133 obtained from the server 11 by the DHCP protocol in the local storage 121.
(2) Boot Operation of Network Computer Except for The First Activation Operation
The boot method of the network computer except for the first activation operation is a local boot in order to reduce the time loss for starting OS caused by downloading the OS via the network. After the activation, when the network computer 12 is kept connecting to the network, it is checked in step S14 if the OS 132 stored in the local storage 121 matches the OS which the server 11 stores for the network computer 12. The type and version of the OS which the server 11 stores can be checked by the OS name notified from the server 11 and the version information contained in the OS name in response to a request from the network computer 12 using the DHCP.

When the OS 132 stored in the local storage 121 does not match the OS stored in the server 11, the OS 132 in the local storage 121 is replaced by the OS stored in the server 11 in step S12. In step S13, the OS start parameters 133 in the local storage 121 are also replaced by the ones on the server 11.

The version and type of OS to be downloaded to the network computer 12 can be intentionally designated by the administrator of the server 11. The administrator can designate a specific type and version of OS to be used in the network computer. The new version may be changed to the old version due to the bugs of the new version, or the type of OS itself may be changed. It is checked in step S14 by not only comparing the versions but also comparing the OS file names if the OS stored in the local storage 121 matches the OS designated by the server 11. If NO in step S14, the OS 132 stored in the local storage 121 is replaced by the OS designated by the server 11 in step S12. In step S13, the OS start parameters 133 in the local storage 121 are also replaced by the ones designated by the server 11. Even if the version of the OS to be used is changed (upgraded or downgraded) during the system operation, or the type of OS is changed during the system operation, the network computer of this embodiment can flexibly cope with such a change. The new OS 132 and new OS start parameters 133 stored in the local storage 121 are used from the next time of activation operation.

Flow of Starting Network Computer

The flow of starting the network computer 12, which includes the OS storage processing shown in FIG. 3, will be described with reference to the flow chart in FIG. 4.

The OS storage processing is preferably performed while the user of the network computer 12 is almost unaware of it as much as possible. For this purpose, the OS storage processing starts just before a main application is started after the OS is started. This processing is performed in the background.

When the power-on operation or reboot operation of the network computer 12 is performed, the boot program stored in the ROM of the network computer 12 starts. In step S101 this boot program in the ROM checks if the OS 132 is stored in the local storage 121.

If YES in step S101, the OS is booted from the local storage 121 in step S102. If NO in step S101, the boot program in the ROM automatically obtains the OS name, the IP address, and the minimum required boot environment for starting the OS from the server 11 by using the DHCP in step S103. In step S104, the boot loader is loaded from the server 11 by using the TFTP (Trivial File Transfer Protocol), and this boot loader instead of the boot program controls.

In step S105, the boot loader loads the OS from the server 11 using the NFS (Network File System) and boots. In step S106, therefore, OS initialization processing starts.

Figure 5:
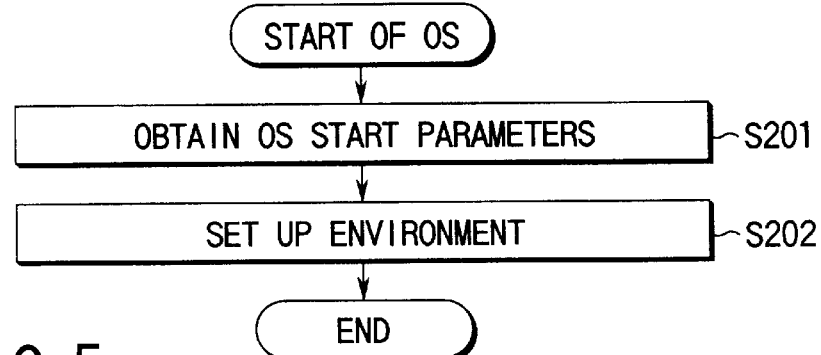
FIG. 5 is a flow chart showing an operation of setting up the environment performed at the time of the OS activation in the network computer according to the embodiment.

In this initialization processing, the OS obtains information of setting up the environment necessary for setting up the working environment of the network computer 12. As shown in FIG. 5, first of all, in step S201 the OS start parameters 133 are obtained from the server 11 using the DHCP. Using the obtained OS start parameters 133, in step S202 of FIG. 5 the network environment and the OS environment necessary for controlling the operation of the network computer 12 are set up.

When the OS is booted from the local storage 121, these environment settings are performed using the OS start parameters 133 stored in the local storage 121.

Figure 4:
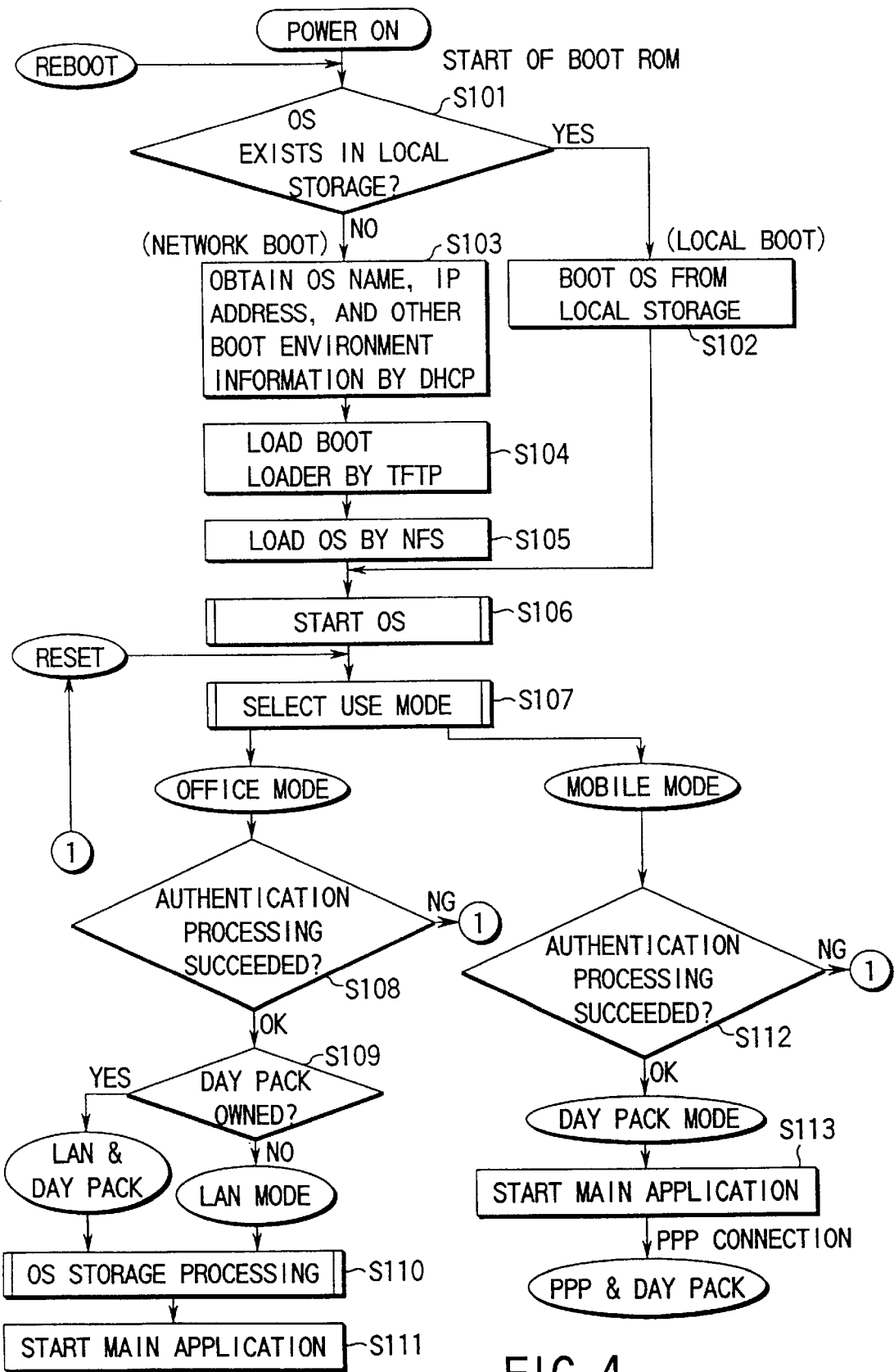
FIG. 4 is a flow chart showing an OS activation processing applied to the network computer according to the embodiment.

After the environment setting processing by the OS itself is performed as described above, use mode selection processing is performed in step S107 of FIG. 4.

In this use mode selection processing, whether the Day Pack 131 whose ownership is set exists and whether the LAN 10 can be used are determined by the OS. The default value of the use mode is determined on the basis of the above determination results. The default value is displayed in the login dialog window of the network computer 12.

In this use mode selection processing, it is checked if the Day Pack 131 whose ownership is set by a user exists. If so, the default value of the use mode is set as the "mobile mode". The DHCP DISCOVER packet is broadcast to check if the LAN can be used, depending on whether of an OFFER packet is received or not in response to the DHCP DISCOVER packet. When the OFFER packet is received, it is determined that the LAN can be used. The default value of the use mode is switched to the "office mode". When the Day Pack 131 whose ownership is set by the user exists in the local storage 121, the "mobile mode", or the "office mode" is displayed in the login dialog as a default value, depending on whether the LAN can be used or not. When the use mode is explicitly changed by the user on the login dialog, the mode is changed to the mode designated by the user. When the OK button on the login dialog is pressed, the present mode is confirmed, and processing for setting this mode starts. An indicator showing this use mode is displayed on the screen. If no local storage 121 exists, or no ownership of the Day Pack 131 has been set by the user although the local storage exists, the default mode is not determined, and it is checked if the LAN can be used. When the environment in which the LAN can be used is determined, the default mode of the use mode is set as the "office mode". The "office mode" is displayed on the login dialog as a default value and the "mobile mode" is invalidated. As described above, if no local storage 121 exists or no ownership has been set by the user in the Day Pack 131 although the local storage 121 exists, the "office mode" is basically selected.

When the use mode is selected in the use mode selection processing, user authentication processing is performed using the user name, password, and the like input in the login dialog in step S108 or S112.

Figure 6:
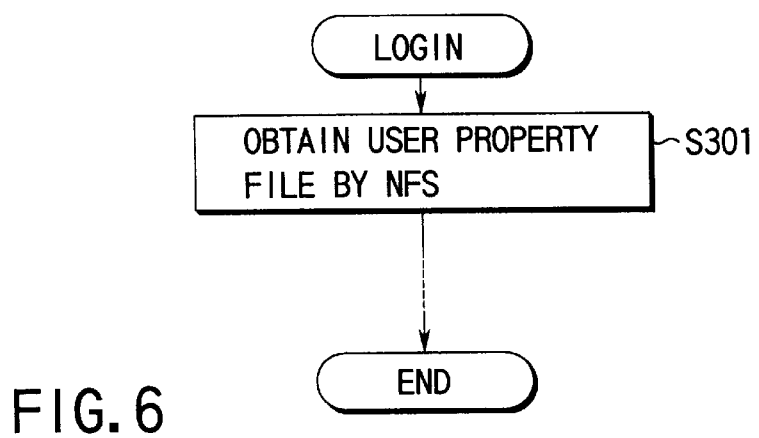
FIG. 6 is a flow chart showing a user property file acquisition operation of the network computer performed when the network computer of the embodiment logs in to the network.
Figure 7:
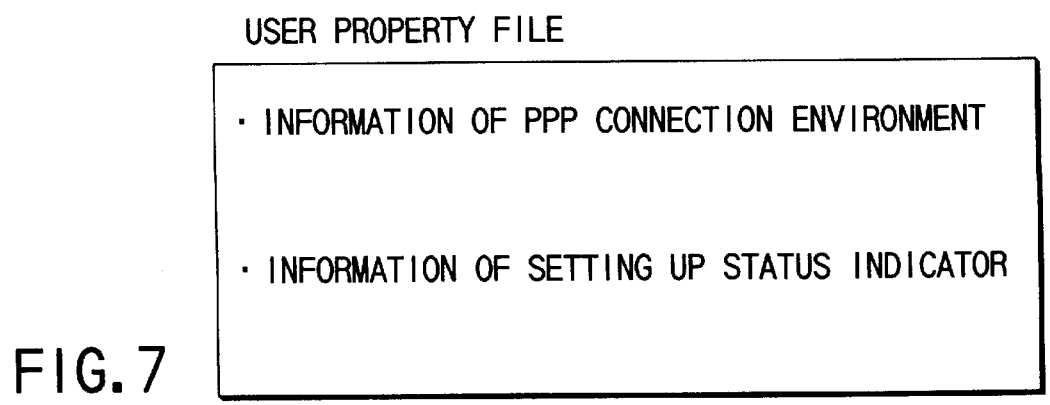
FIG. 7 is a view showing a user property file obtained when the network computer of the embodiment logs in to the network.

As shown in FIG. 6, in this login processing the OS obtains the user property file from the server 11 using the mounted NFS in step S301. As shown in FIG. 7, the user property file contains information of PPP connection environment such as a telephone number for dialing up the server 11 and information of setting up a status indicator displayed on the desktop screen of the network computer 12.

When the user authentication processing in step S108 or S112 in FIG. 4 is successful, and the "office mode" is selected, the LAN mode or the LAN & Day Pack mode is set as a connection mode on the basis of the presence/absence of the ownership of the Day Pack 131 in step S109.

Figure 3:
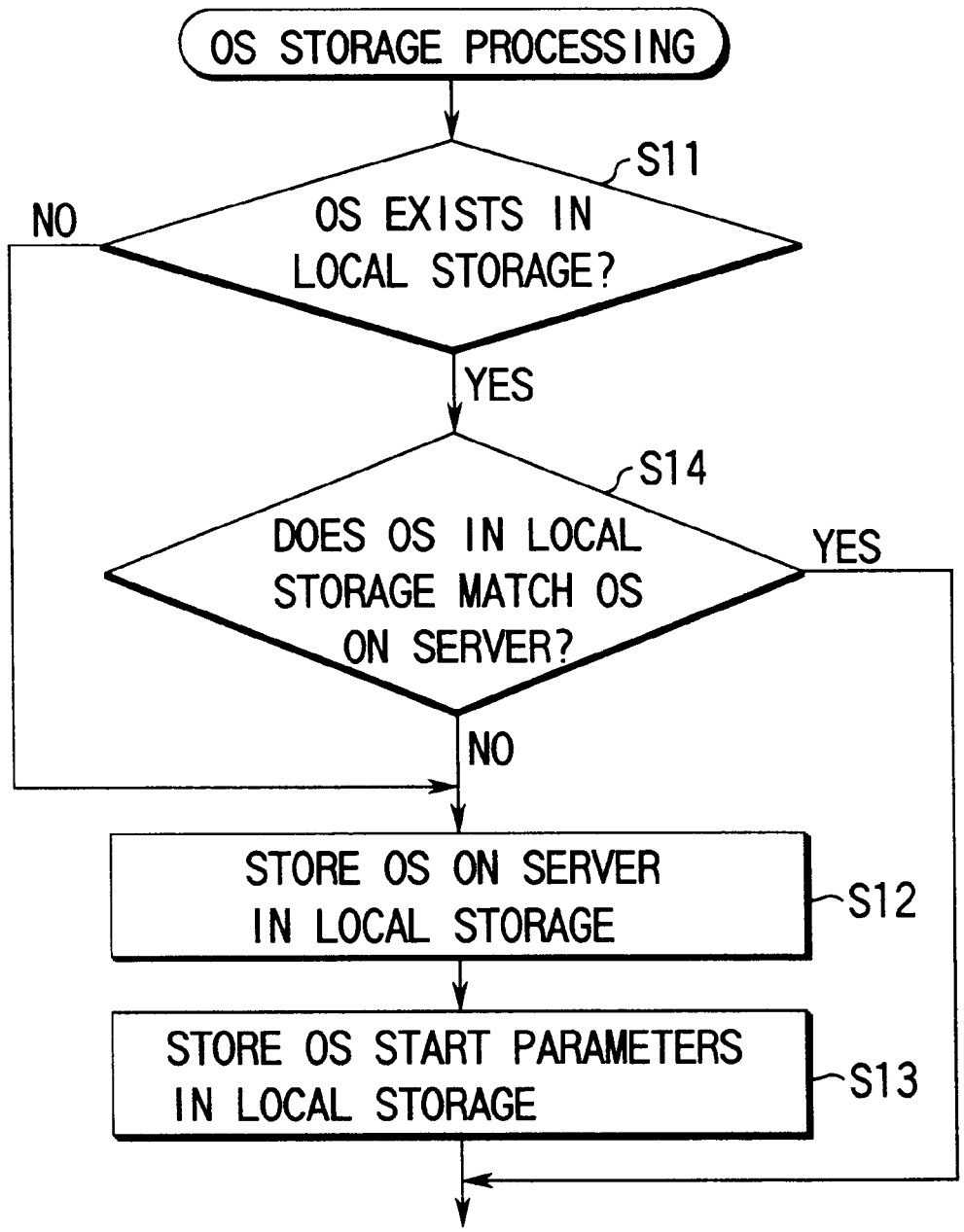
FIG. 3 is a flow chart showing the procedure of OS storage processing applied to the network computer according to the embodiment.

In step S110, the OS storage processing described with reference to FIG. 3 is executed. When no OS is stored in the local storage 121 or the OS 132 stored in the local storage 121 does not match the OS notified from the server 11, the OS 132 is obtained from the server 11 by the mounted NFS.

Together with the OS start parameters obtained in step S201 of FIG. 5 and step S301 of FIG. 6, the obtained OS 132 is stored in the local storage 121. Upon completion of this OS storage processing, the main application is started in step S111 of FIG. 4.

When the "mobile mode" is selected, the Day Pack mode or PPP & Day Pack mode is set in accordance with PPP connection/disconnection operation by the user. In either mode, the main application is started in step S113 of FIG. 4.

When the computer program including the storage processing for the OS 132 and the OS start parameters 133 and boot processing sequences of this embodiment is recorded on a recording medium, the same effect as in the above embodiment can be obtained by simply applying the computer program to the network computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network computer connected to a server computer, comprising:

a local storage device for storing an operating system and operating system start parameter downloaded from said server computer;

first determining means for determining whether or not the local storage device stores the operating system;

network boot means for downloading an operating system and an operating system start parameter corresponding to the operating system from said server computer and starting the network computer using a downloaded operating system and a downloaded operating system start parameter when said first determining means determines that the local storage device does not store an operating system;

local boot means for starting the network computer using the operating system and the operating system start parameter stored in said local storage device when said determining means determines that the local storage device stores the operating system;

second determining means for determining whether or not the local storage device stores a predetermined operating system designated by the server computer, after the network computer started; and replacing means for replacing an operating system and an operating system start parameter stored in said local storage device by the predetermined operating system and a predetermined operating system start parameter corresponding to the predetermined operating system when said second determining means determines that the local storage device does not store the predetermined operating system.

2. The network computer according to claim 1, wherein said operating system start parameter comprises at least one of network server information, client information, and path names of files of an operating system to be downloaded to said network computer.

3. The network computer according to claim 1, wherein said operating system start parameter comprises Dynamic Host Configuration Protocol parameters.

4. A boot method of a network computer connected to a server computer, said network computer comprising a local storage device for storing an operating system and operating system start parameter downloaded from the server computer, the method comprising the steps of:

determining whether or not the local storage device stores an operating system;

downloading an operating system and an operating system start parameter corresponding to the operating system from said server computer and starting the network computer using a downloaded operating system and a downloaded operating system start parameter when it is determined that the local storage device does not store an operating system;

starting the network computer using the operating system and the operating start parameter stored in said local storage device when it is determined that the local storage device stores the operating system;

determining whether or not the local storage device stores a predetermined operating system designated by the server computer; and downloading the predetermined operating system and a predetermined operating system start parameter corresponding to the predetermined operating system from the server computer and replacing an operating system and an operating system start parameter stored in said local storage device by a downloaded predetermined operating system and a downloaded predetermined operating system start parameter when it is determined that the local storage device does not store the predetermined operating system.

5. The method according to claim 4, wherein said operating system start parameter comprises at least one of network server information, client information, and path names of files of an operating system to be downloaded to said network computer.

6. The method according to claim 4, wherein said operating system start parameter comprises Dynamic Host Configuration Protocol parameters.

* * * * *